United States Patent [19]

Parker et al.

[11] Patent Number: 4,775,025
[45] Date of Patent: Oct. 4, 1988

[54] MOTORCYCLE WITH RIDE HEIGHT SUSPENSION ADJUSTMENT

[76] Inventors: James Parker, 102 S. Capitol, Santa Fe, N. Mex. 87501; Jeff Karr, 11154 Blix St., North Hollywood, Calif. 91602

[21] Appl. No.: 938,287

[22] Filed: Dec. 5, 1986

[51] Int. Cl.⁴ ............................................. B62K 25/12
[52] U.S. Cl. ................................. 180/219; 280/275; 280/283; 280/703
[58] Field of Search .................. 180/219, 41; 280/275, 280/277, 284, 283, 703, 688, 6 R, 6 H

[56] References Cited

U.S. PATENT DOCUMENTS

| | | | |
|---|---|---|---|
| 4,265,329 | 5/1981 | de Cortanze | 180/219 |
| 4,398,741 | 8/1983 | Hiramotsu | 180/219 |
| 4,433,850 | 2/1984 | Miyakoshi et al. | 288/277 |
| 4,568,101 | 2/1986 | Bleustein et al. | 280/6 R |

*Primary Examiner*—John J. Love
*Assistant Examiner*—Donn McGiehan
*Attorney, Agent, or Firm*—Louis J. Bachand

[57] ABSTRACT

An adjustable ride height motorcycle is provided which automatically compensates for lean by raising the motorcycle as leaning occurs, by reversibly increasing the displacement of front and rear suspension swing arms as a function of leaning into turns by rotating through an angle the upper portion of the shock absorbers acting upon the swing arms.

20 Claims, 6 Drawing Sheets

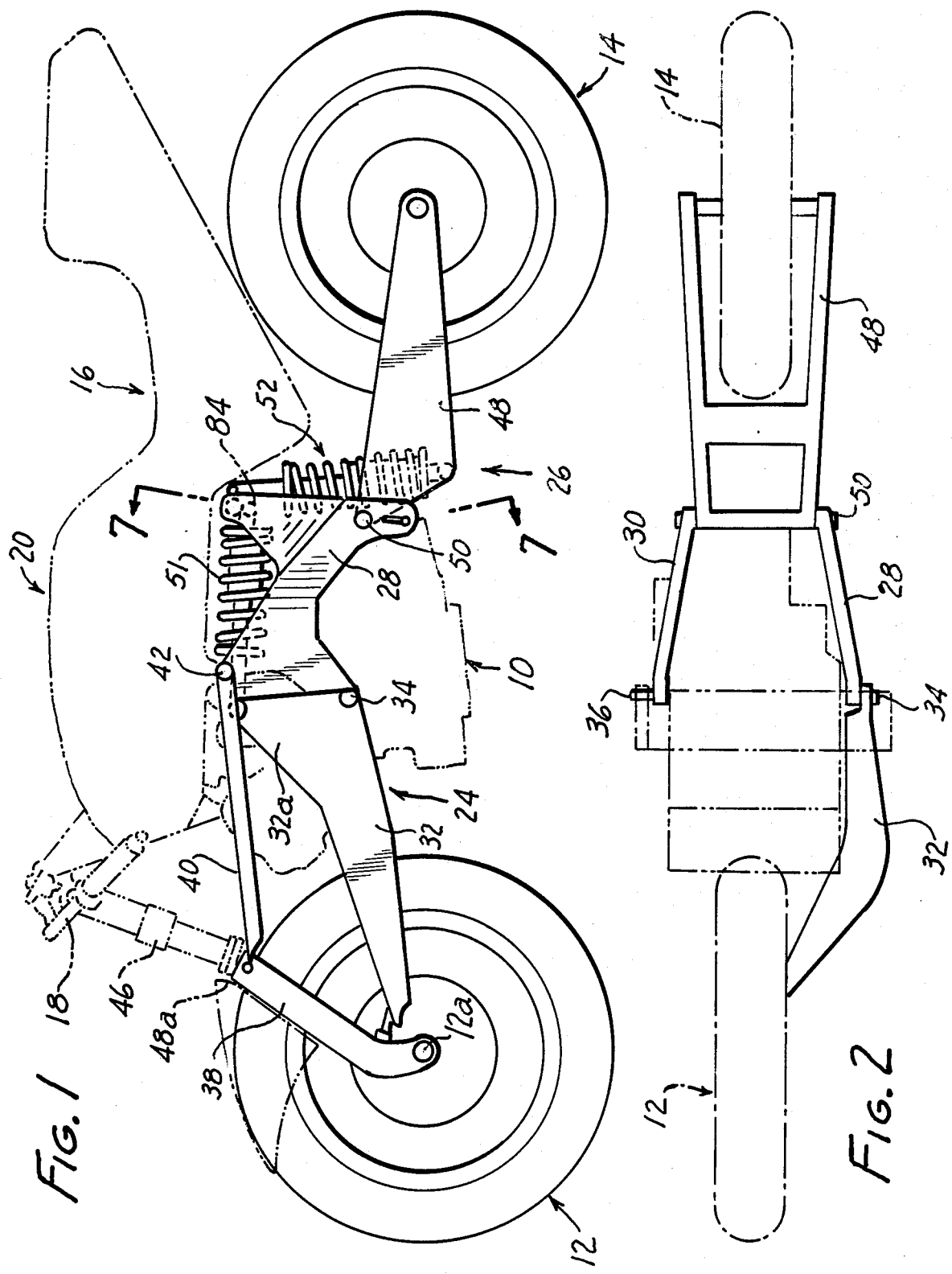

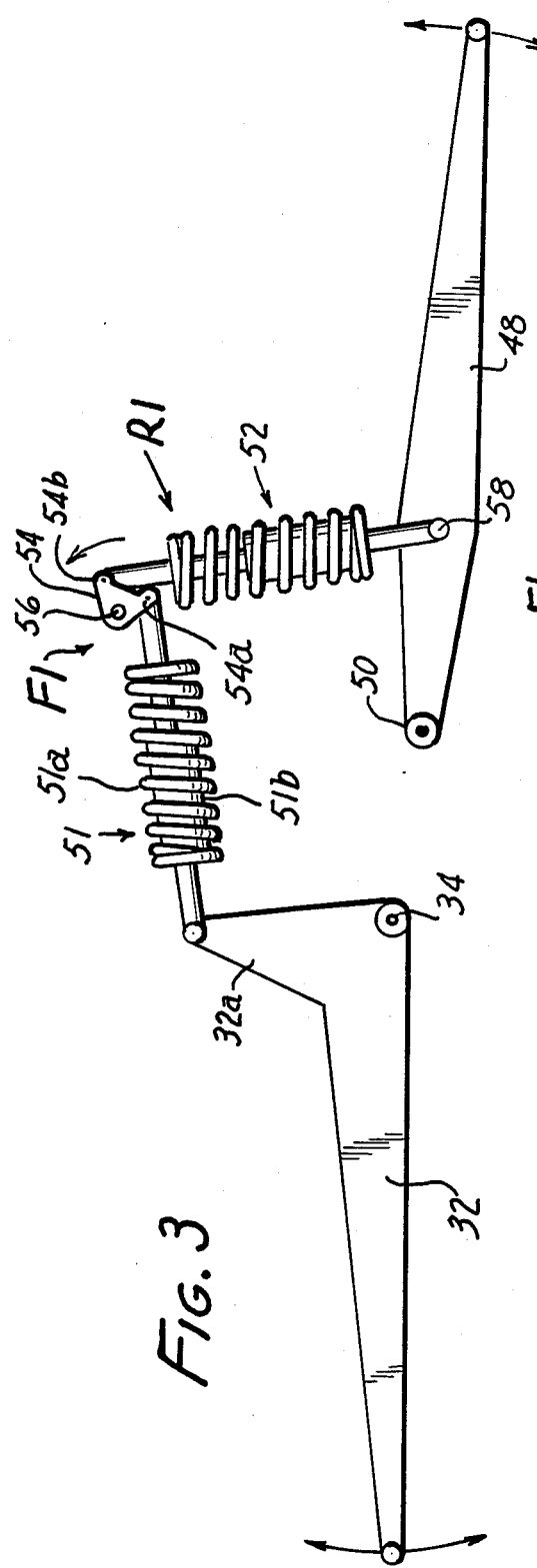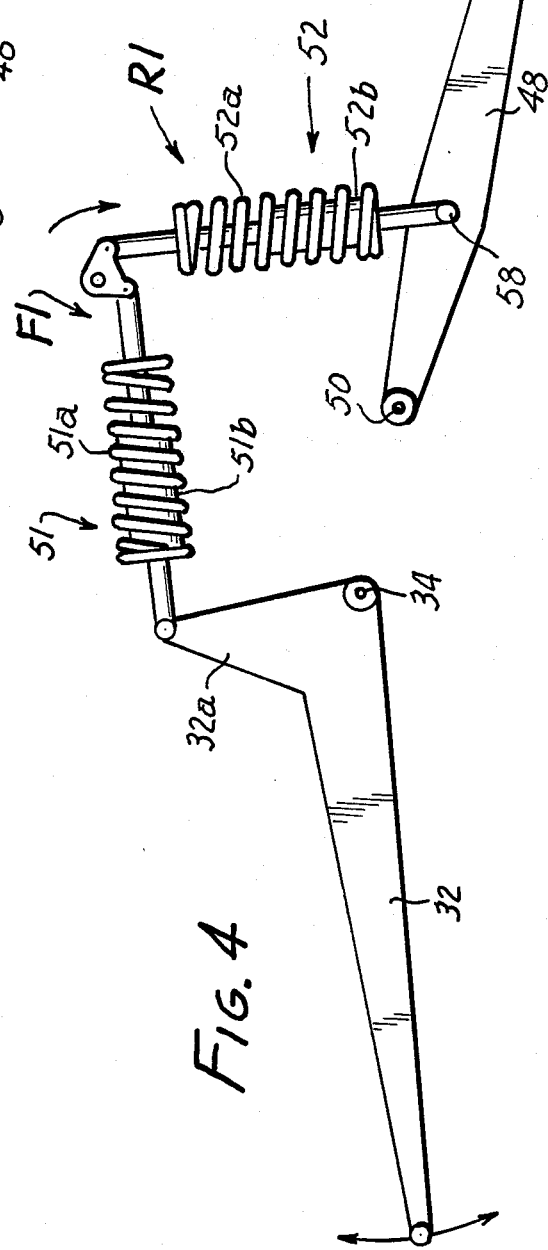

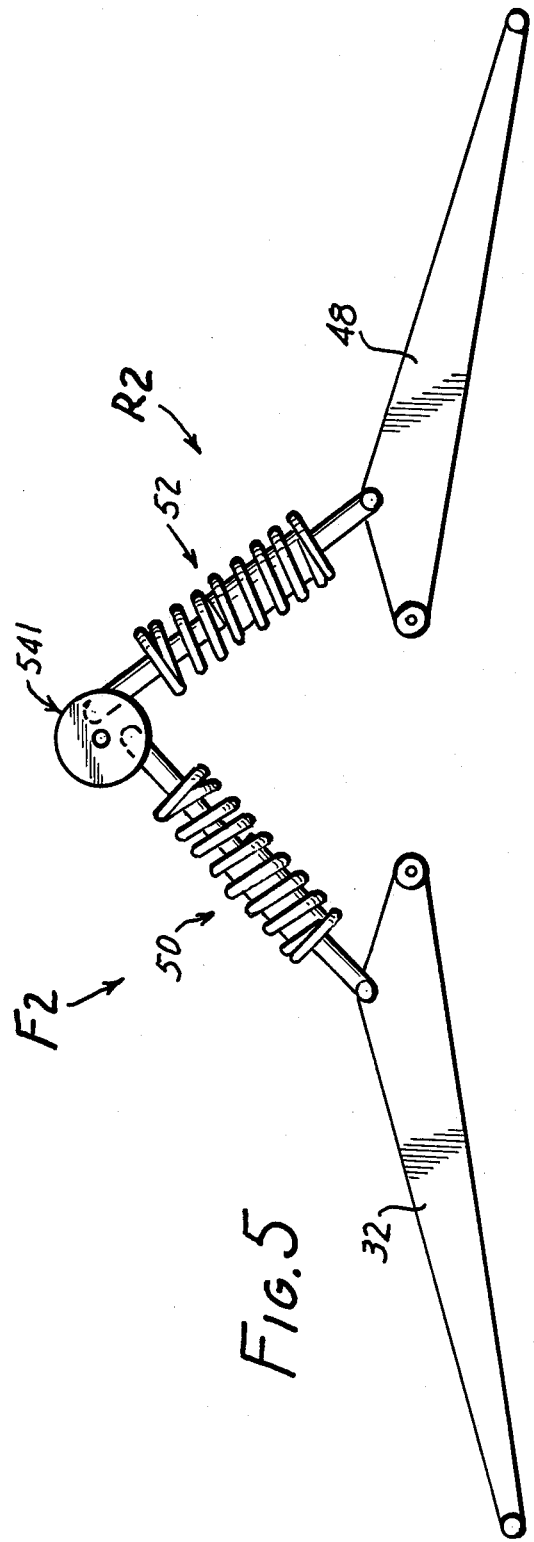
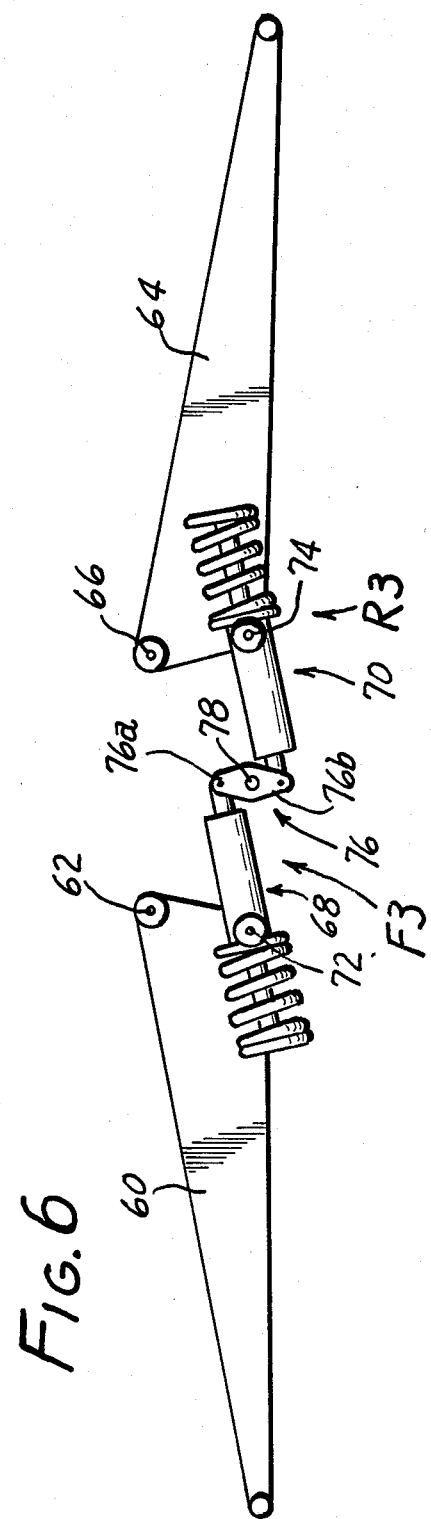

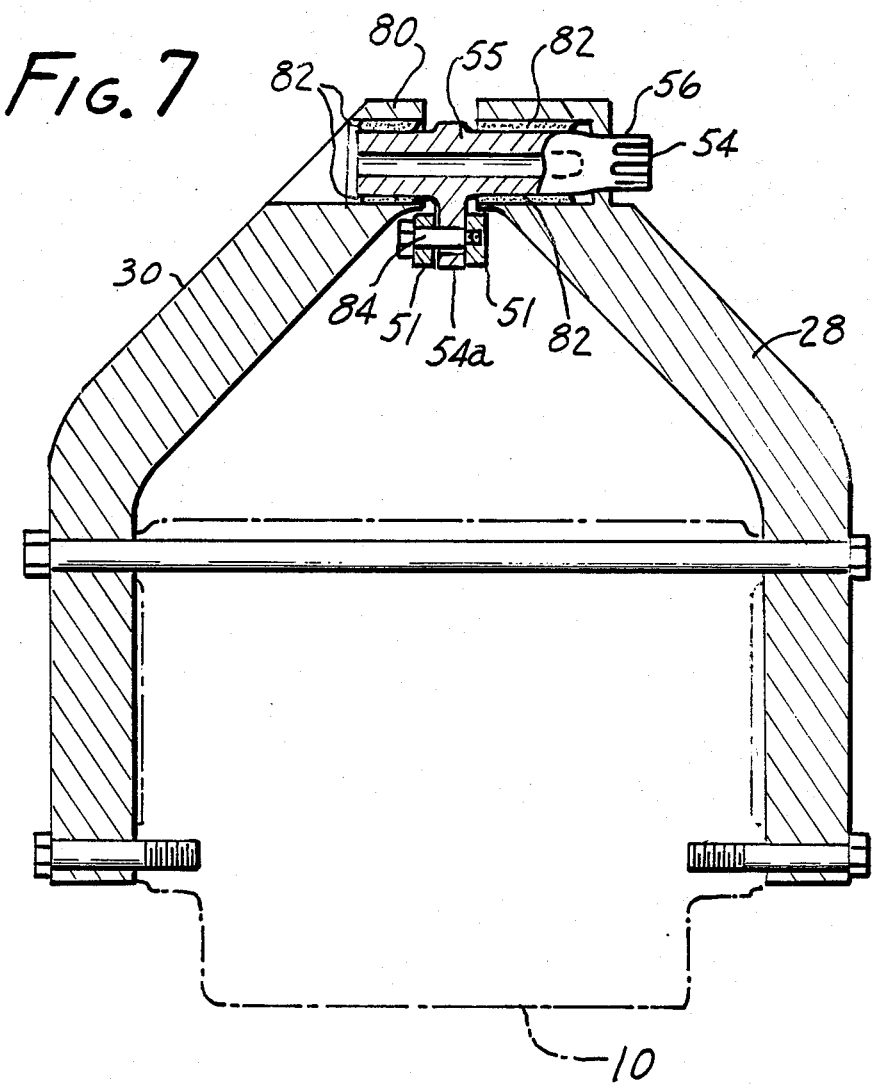

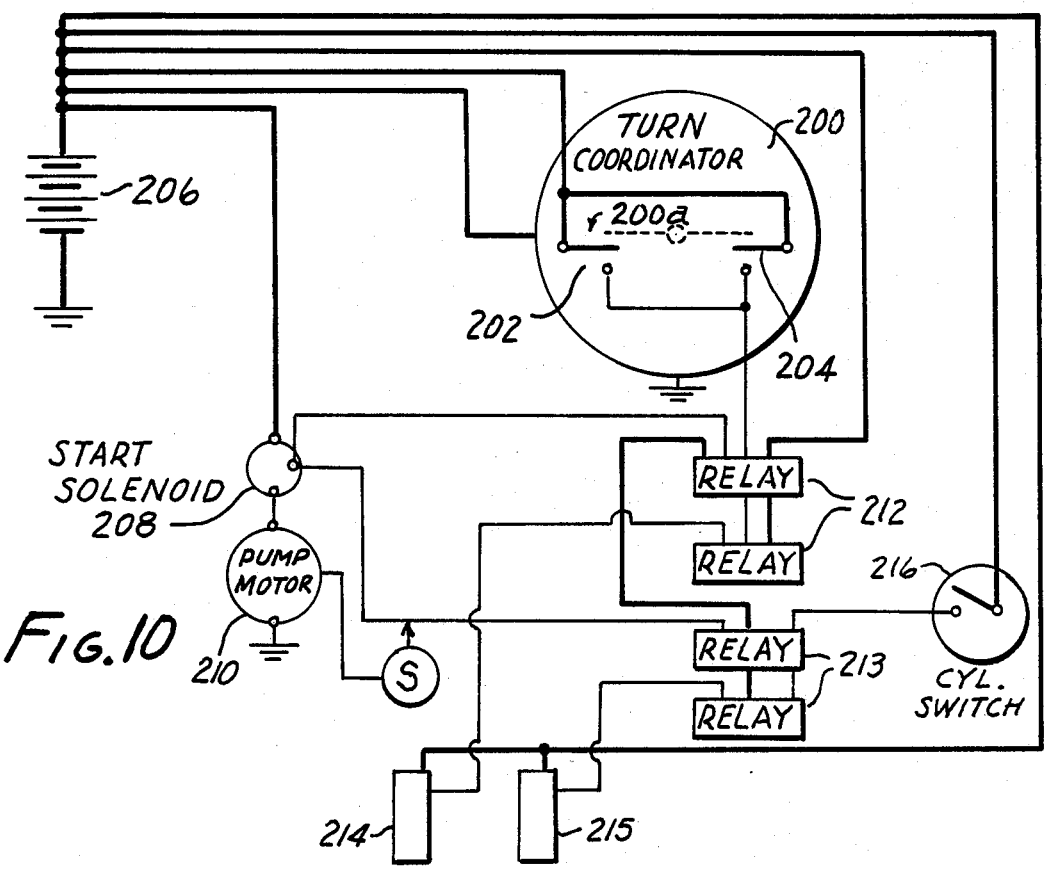
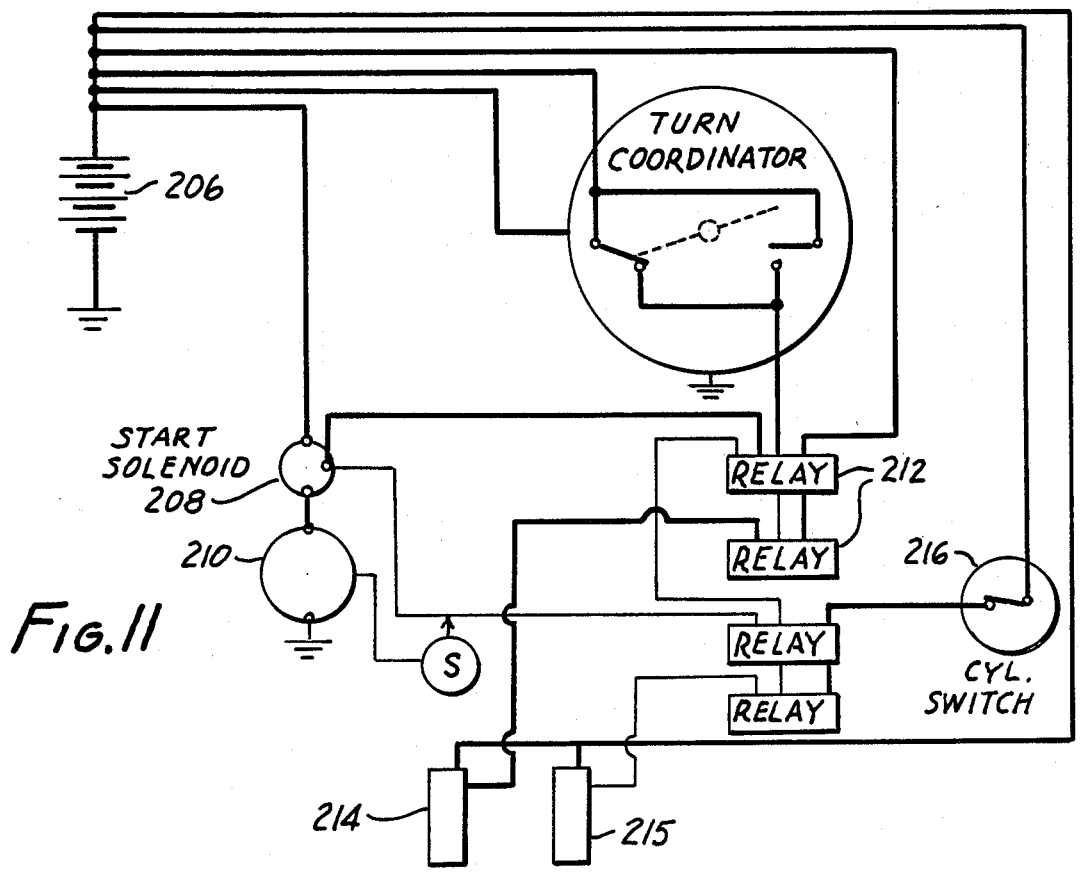

MOTORCYCLE WITH RIDE HEIGHT SUSPENSION ADJUSTMENT

TECHNICAL FIELD

The present invention is generally related to improvements in motorcycles. More specifically, this invention is related to motorcycle suspension systems which give the rider better control on straightaways through lowering of the center of gravity, and are better adapted to cornering at high speeds by raising the motorcycle clearance above the ground, automatically, in response to a sensed position of the machine. The invention is directed to a suspension system in which the front and rear suspension systems are jointly or separately adjustable by an adjustment mechanism that adjusts, simultaneously if desired, the ride height of the front and rear suspension to an optimum state for the riding situation, e.g. on a straightaway or cornering, reversibly and immediately, responsive to the situation being encountered. The present invention is particularly adapted to a motorcycle having a one-sided front swing arm suspension or like front arm suspension in which a differential displacement can be exerted on the suspension to change the relative spacing of the front wheel and frame independent of the influence of terrain.

BACKGROUND OF THE INVENTION

Before addressing the present invention, the following background is provided with respect to the development of front and rear suspension systems in modern motorcycles.

Rear swing arm suspensions are now well known in the motorcycle industry and have become common in recent years. In such suspensions the rear wheel of the motorcycle is journaled to the end of a U-shaped fork, or swing arm. The swing arm is hinged to the frame of the motorcycle and extends rearwardly. The rear swing arm and wheel undergo vertical swinging motion in response to road shocks and changing weight loads. The swing arm is spring loaded downwardly, typically by means of a compression spring, so that the swing arm can bear ordinary weight loads as well as road shocks. Various combinations of shock absorbers, dampers, and springs have been used to spring load and damp the swing arm. Road shocks and changing weight loads are typically transmitted via swinging motion of the swing arm to a shock absorber that incorporates a damper as well as the compression spring that provides the necessary downward force on the swing arm. There is commonly provided some mechanism for adjusting the spring force applied to the swing arm in order to adjust the ride of the motorcycle or to accommodate different riders, differing weight loads or changed road conditions.

Front suspension systems of motorcycles have not been as well developed. Until recently the front suspension systems of motorcycles have been virtually universally of the conventional telescoping fork design. Such designs have a recognized disadvantage in that all weight loads and road shocks on the front wheel are transmitted up through the front fork to the frame of the motorcycle, at a point on the frame which is well above and forward of the center of gravity of the motorcycle. This results in the front fork, the attached steering head, and the upper portions of the frame all being necessarily stronger, and thus heavier, than would be necessary to merely bear the torsional loads required to steer the motorcycle. It also results in the entire front suspension system turning with the front wheel, when all that needs to be turned to effect steering is the front wheel.

In U.S. Pat. No. 4,526,249, to Parker, a co-inventor herein, there was disclosed a motorcycle having a novel one-sided front swing arm suspension system. This system includes upper and lower control arms which are hinged to the frame of the motorcycle and which extend forwardly from the frame to a kingpin. The kingpin extends alongside one side of the front wheel at a rake angle which is similar to the rake angle of a conventional telescoping fork, and curves around the outer periphery of the wheel. The front wheel is journaled in a cantilevered fashion to an axle which extends transversely from the lower end of the kingpin. The lower control arm is arcuate and extends alongside of and around the front wheel so as to provide clearance for steering of the front wheel. The lower control arm is connected to the lower end of the kingpin by means of a ball joint which allows the front wheel to be steered while also allowing swinging motion of the control arm. The upper control arm extends forwardly from the frame of the motorcycle and is connected to the upper end of the kingpin, above the front wheel, also by means of a ball joint. The upper and lower control arms swing in parallel so as to absorb road shocks and weight loads on the front wheel. Details of this suspension system are disclosed in the U.S. Pat. No. 4,526,249, which is expressly incorporated herein by reference. The lower control arm of this system will be referred to hereinafter as the front swing arm.

It will be recognized that the advent of the one-sided front swing arm suspension described above creates a motorcycle design having both front and rear swing arm suspension systems. An opportunity afforded by this development is the use of mechanisms for selectively adjusting the amount each of the swing arms are deflected, as a function of the lean angle of the motorcycle.

In this regard, it has been further recognized that one primary advantage of the one-sided front swing arm suspension has been that weight and shock loads on the front wheel can be effectively borne by the motorcycle frame at a point low and close to the center of gravity of the frame, rather than at the point where the steering column is journalled to the frame.

BRIEF STATEMENT OF THE INVENTION

It is an object of the invention to provide a suspension mechanism whereby the weight and shock loads on both wheels are borne by the motorcycle frame at a point close to its center of gravity. It is a further object to provide in such a suspension an adjustment mechanism by which both front and rear swing arms can be separately or simultaneouly pre-loaded with a desired level of displacement through a variable effective length arm, so as to adjust the ride height of one or both wheels of the motorcycle at once. Yet another object is to have the suspension adjustable by the rider or automatically during the ride, and continuously responsive to ride conditions so as to have at all times during the ride the optimum height for the conditions being encountered.

It is another object to obviate what has been in street and roadracing motorcycles a basic design conflict. The machine must bank into a turn to change direction. But this banking necessitates high engine placement in the chassis to keep the powerplant and related hardware from dragging on the pavement in the corners. The rider's foot controls (and in turn the entire rider control layout) must be positioned high enough to clear the pavement while at maximum cornering angle. This necessarily means a too high center of gravity which can greatly interfere with motorcycle control and limit maximum cornering speed.

And when the motorcycle is traveling in a straight line this high engine and rider placement is a handicap to maximizing performance. The high center of gravity makes it harder to maneuver at low speed, a problem compounded by a relatively high seat height. The high center of gravity also makes the machine very unstable to pitch moments. Conventional high performance motorcycles are limited in both acceleration and braking by chassis pitch. Under power, the front wheel lifts off the ground; under braking the rear wheel lifts off the ground. With either wheel off the ground the machine becomes extremely unstable. In both cases the high chassis center of gravity puts an undue limit on both acceleration and braking. Additionally, the tall conventional motorcycle has an unnecessarily large frontal area for straight line travel, unduly increasing aerodynamic drag.

The advent of the swingarm front suspension provides an opportunity to make the motorcycle have the optimum ride height for both straight running and extreme braking. In accordance with the present invention ride height can be adjusted, e.g. at a central point by arranging the front and rear spring/damper units so that they both have an end mount at the arms of a common rotor, such as a bellcrank. By rotating the rotor the spring/damper mounts, acting as displacement arms, move laterally, changing their effective length, and thus displace up or down relative to the frame, the position of one or both swingarms. The ability of the suspension to absorb bumps is unaffected by the thusly effected ride height change, since only the effective length of the shock absorber is changed; the dampers and springs are unaltered.

With this system, the motorcycle can have a low ride-height during straight running, then progressively gain ride height as it is banked into a turn. The advantages are numerous: when vertical the machine can be accelerated and braked harder. Additionally, the better mass centralization at the low ride height setting will allow the motorcycle to initiate banking more quickly. Then once banked over, the machine can have all the cornering ground clearance necessary. This system allows the ride height to be optimized at all times, instead of being locked into one compromise setting.

Accordingly, the present invention provides a motorcycle having front and rear swing arm suspensions wherein the height of the motorcycle is readily adjusted suitably simultaneously and without affecting response of each swing arm to weight loads and road shocks. Further, these weight loads and road shocks are transmitted from the wheels and borne by the motorcycle frame at a point close to the center of gravity of the motorcycle, and without involvement of the front wheel steering mechanism, unlike previously decribed machines, and withal the suspension system is amenable to automatic adjustment of ride height.

In accordance with the present invention, an articulated arm defined by the spring/damper and by a rotor is relatively lengthened or shortened by rotating the rotor and the swing arm displaced accordingly. More specifically there is provided a motorcycle having a frame, front and rear wheels carried on the frame by respective front and rear wheel swing arms, and means for adjusting the frame position relative to the wheels to correspondingly vary the motorcycle ride height, the means comprising an articulated arm having first and second displacement arm portions coupled between the front wheel swing arm and the frame for relatively different angular disposition to lengthen or shorten the effective length of the arm portions combined, whereby the frame position relative to the front wheel is adjusted and the motorcycle ride height correpondingly raised or lowered.

In this and like embodiments, there is also included if desired a rear wheel height adjustment by the use of another articulated arm having first and second displacement arm portions coupled between the rear wheel swing arm and the frame for relatively different angular disposition to lengthen or shorten the effective length of the arm portions combined, whereby the frame position relative to the rear wheel is adjusted and the motorcycle ride height correspondingly raised or lowered.

Typically, the first displacement arm portion is pivotally mounted by a rotating element to the frame, and the second displacement arm portion is pivotally secured to the first displacement arm portion at a point radially offset from the first displacement arm portion mounting to the frame for varying the effective length of the arm portions combined as a function of rotation of the rotating element; each front and rear wheel swing arm coupled first arm portion is pivotally mounted to the frame, and each second arm portion is pivotally secured to its respective first arm portion at a point radially offset from the respective first arm portion mounting to the frame for varying the effective length of said arm portions combined as a function of rotation of the rotating element; the second displacement arm portion defines a spring-shock absorber unit; there is also included a rotating element mounted to the frame, the rotating element having a radially disposed extent defining the first displacement arm portion; the rotating element has angularly related first and sescond radially disposed extents, these extents defining the first displacement arm portions for the front and rear wheel swing arm adjustment respectively; the rotating element is a unitary body whereby rotation of the element simultaneously varies the effective length of the rear wheel and the front wheel displacement arm first and second portions combined; the frame position adjusting means further includes a crank for bodily shifting the first displacement arm portion relative to the frame with the second displacement arm portion coupled thereto and to said swing arm to thereby vary the angular disposition of the first and second displacement arm portions and adjust the motorcycle height correspondingly; the frame position adjusting means further includes a rotating element, the rotating element having a radially disposed extend defining the first displacement arm portion and driver means cooperating with the crank for rotation of the rotating means; the rotating element driver means and said crank define cooperating gear means for crank rotation of the rotating element; the crank comprising a rotating gear and means to rotate the gear, the rotating element defining a toothed surface engageable with the crank rotating gear; the crank rotating means comprises a manually operable handle which is shiftable by the rider during riding to vary the motorcycle ride height through rotation of the rotating element and displacement of said swing arm by the displacement arm portions whose relative angularity and effective combined length is varied by the element rotation; or, the crank rotating means comprises a lever fulcrumed on the crank, and an hydraulically shiftable piston having a rod coupled to lever in crank rotating relation; there is also included means to admit hydraulic fluid under pressure to said piston, for shifting said piston in crank rotating relation; there is further included sensing means sensing the angle of said motorcycle to the ground, and means responsive to an increase or decrease in that angle to admit or withdraw hydraulic fluid to or from the piston to rotate said rotating element and correspondingly raise or lower said frame relative to the wheels to accommodate angled cornering or upright travel of the motorcycle. Typically, the sensing means is a switch adapted to move with the motorcycle into a leaning condition, and there is included also a pivotally mounted needle adapted to remain immobile relative to the switch during leaning of the motorcycle, the needle and switch being juxtaposed to contact upon a predetermined condition of lean being achieved, and not to contact in the absense of such a lean condition.

In another embodiment, there is provided in a motorcycle having a frame, a front wheel and a rear wheel, and a front swing arm and a rear swing arm each pivotally connected to the frame, the improvement comprising a single point adjustable suspension system, including a front shock absorber having first and second ends, the first end of the first shock absorber being pivotally connected to the front swing arm and the second end of the front shock absorber being pivotally connected to a first arm of a bell crank rotatably journalled to the frame of the motorcycle, the first end of the rear shock absorber being pivotally connected to the rear swing arm and the second end of the rear shock absorber being pivotally connected to a second arm of the bell crank, and the bell crank including means for selectively adjusting and setting the angular position of the bell crank to as to thereby adjust the ride height of the motorcycle.

Thus there is provided a suspension system for a motorcycle having front and rear swing arms. The suspension system comprises front and rear shock absorbers, each of which has a first end and a second end. The first end of the front shock absorber is connected to the front swing arm, and the first end of the rear shock absorber is connected to the rear swing arm. The second ends of the two shock absorbers are connected to elements of a cam or bell crank mechanism which is rotatably mounted on the frame of the motorcycle. The angular position of the cam or bell crank mechanism is selectively adjustable so as to permit adjustment of the chassis mounting point of each of the shock absorbers at once. As a consequence, all weight and shock loads are transmitted to a single point on the motorcycle frame, along a direct path which does not include the steering column. Rotation of the bell crank effectively operates to adjust the ride height of the motorcycle at both wheels simultaneously.

BRIEF DESCRIPTION OF THE DRAWINGS

The accompanying drawings are incorporated in and form a part of this specification. The drawings illustrate the best mode known to the inventor of practicing the present invention and, together with the following detailed description, serve to explain the structure and operation of the invention. In the drawings:

FIG. 1 is a side view in elevation of a motorcycle equipped with the suspension system of the present invention;

FIG. 2 is a top plan view in of the lower portion of the suspension;

FIG. 3 is a schematic view thereof;

FIG. 4 is a view like FIG. 3, but with the suspension in a different state of adjustment;

FIG. 5 is a view like FIG. 3, but showing an alternative form of the invention;

FIG. 6 is a view like FIG. 3, but showing still another alternative form of the invention;

FIG. 7 is a a view in section taken on line 7—7 in FIG. 1 of a ride height adjustment mechanism according to the present invention;

FIG. 10 is a schematic of an electrical control circuit for the hydraulic control for the automatic adjustment of the suspension, depicted as though the motorcycle was in an upright position; and, FIG. 11 is a view like FIG. 10 with the control circuit depicted as though the motorcycle was in a leaned-over condition.

DETAILED DESCRIPTION OF THE PREFERRED EMBODIMENT

Figure 8:
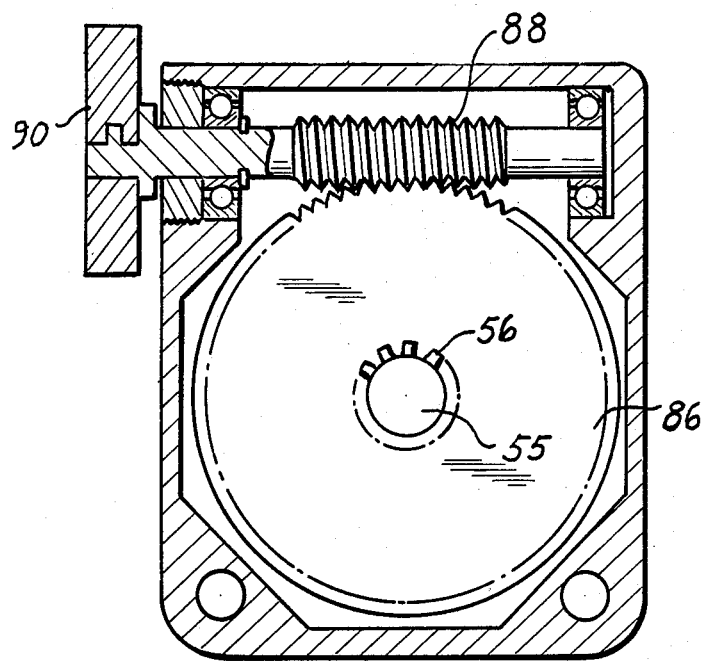
FIG. 8 is an elevational view of a worm gear arrangement for the adjustment mechanism of FIG. 7.

Referring first to FIGS. 1 through 4, motorcycle constructed in accordance with the preferred embodiment of the present invention includes generally an engine 10, a front wheel 12, and a rear wheel 14, as well as various conventional components, for example seat 16, handlebar 18, fuel tank 20, and cowlings 22. The illustrated motorcycle departs from conventional tubular frame construction in that the engine 10, along with chassis plates 28, 30 rigidly attached to the right and left sides of the engine, defines the frame to which the front and rear suspension systems are attached. The present invention is however not limited to the illustrative frame arrangement, and may use any frame arrangement which permits operation of the suspension to be hereinafter detailed.

The motorcycle includes a one-sided swing arm front suspension 24 and a conventional swing arm rear suspension 26. The one-sided front suspension system 24 is of the type described and claimed in U.S. Pat. No. 4,526,249, issued July 2, 1985 to James G. Parker.

The present adjustable suspension acts to vary the displacement of the front and/or rear wheel by exerting a force of the respective swing arms from a displacement arm of variable effective length. For this purpose the front suspension 24 has an arcuate lower front swing arm 32 which extends forwardly and slightly downwardly from the engine 10 and associated chassis plates 28 and 30. The lower swing arm 32 is hinged to the forward lower corner of the left chassis plate 28 by means of a pivot pin 34, and is hinged to the lower forward corner of the right chassis plate 30 by means of a pivot pin 36. Pivot pins 34 and 36 are co-linear and extend horizontally and transversely with respect to the longitudinal axis of the motorcycle, such that the lower swing arm 32 swings in a vertical plane in response to weight loads and road shocks, as discussed further below. The lower swing arm includes an integral cross member 32a which crosses over the top of the engine 10 so as to rigidly connect the two sides of the swing arm 32 and so that the swing arm 32 swings about the two pivot pins 34 and 36.

The forward portion of the swing arm 32 is arcuate in shape and extends around the left side of the front wheel 12, so as to allow the front wheel 12 sufficient clearance to rotate through its ordinary turning range. The forward end of the swing arm 32 is attached by means of a ball joint to a kingpin 38. The kingpin 38 extends generally alongside the left side of the front wheel at a rake angle that is approximately equivalent to the rake angle of a front fork in a conventional motorcycle construction. Extending laterally from the lower end of the kingpin 38 is an axle 12a, on which the hub of the front wheel 12 is mounted in cantilever fashion. An upper swing arm 40 extends forwardly from the chassis plates 28 and 30 and is generally parallel to the lower swing arm 32. More particularly, the upper swing arm 40 is generally triangular in shape, and is pivotally connected at its rear apices to the opposite chassis plates 28 and 30 by means of pivot pins 42. The forward apex of the upper swing arm 40 is connected by means fo a ball joint 40a to the upper end of the kingpin 38. In operation, the upper swing arm 40 swings in a vertical plane in parallel with the lower swing arm 32, such that the two front swing arms effectively form a parallelogram suspension system. A telescoping steering column 46 connects the kingpin 38 to the handlebar 18 and accommodates vertical swinging motion of the front wheel 12 and kingpin 38 in response to road shocks and weight loads.

For purposes of the invention, as with the front suspension, the rear suspension incorporates a swing arm which is acted upon by the displacement arm of the invention for raising or lowering the motorcycle. Specifically, the rear suspension incorporates a conventional rear swing arm 48 to which the rear wheel 14 is mounted. The rear swing arm is generally a U-shaped fork, but may be one-sided like the front lower arm, and is pivotally attached to the lower rear corners of the chassis plates 28 and 30 by means of a pivot shaft 50.

Swinging motion of the front and rear swing arms 32 and 48 is controlled by means of front and rear sprung and damped shock absorbers 51 and 52, respectively, which are mounted to function as displacement arms F1 and R1. Referring to FIGS. 3 and 4, shock absorber 51 includes a spring 51a and a damper 51b. Shock absorber 51 and 52, each include a spring and liquid gas filled damper (fluid or fluid and gas), and is generally of the type commonly used in the motorcycle industry in connection with conventional rear swing arm suspension systems.

Suspension adjustment for ride height control, including at a single point, is accomplished by introducing a novel connection of the upper end of the shock absorbers to the frame. Rather than the conventional bolting to the frame or fixed location on the frame, the shock absorber upper ends in the present invention are mounted to a displaceable and only relatively fixed mount. The mount, as will be seen below, comprises a rotatable means which has radially spaced points adapted to mount the upper ends of the shock absorbers. By rotation of the rotatable element, the radially spaced points thereon are shifted along a circumferential path. Because the translation of the mounting points changes the angular relation between the shock absorber defined arm portion and the rotating element defined radially extending arm portion, the net or effective length of the two arm combined is variable as a function of the rotation of the rotatable element. In a typical embodiment of the invention now to be described, both front and rear swing arms are coupled to a common rotatable element and both front and rear riding heights are adjusted from a single point i.e. the rotatable element by a common rotation thereof. The relative angular disposition of the radially disposed arm portions defined by the rotating element is selected to give a desired amount of ride height adjustment for a given degree of rotation, for example, where the rotating element arm portions are at a relative angle to each other of 90 degrees, and have a common length of one inch (the radius of the rotating element), a rotation of 45 degrees will take the motorcycle through a height change of approximately 2 inches, from frame to ground, where the swing arm length is 21 inches and the point of attachment of the shock absorber is 7 inches from the swing arm pivot.

Referring now particularly to FIGS. 3 and 4, the front shock absorber 51 portion of arm F1 is pivotally connected at one end to the cross member 32a of the front swing arm 32. At its opposite end, shock absorber 51 is pivotally connected to a second portion of arm F1, defined by arm 54a of an adjustable ride height rotating element in the form of bell crank 54. Bell crank 54 is rotatable about a pivot pin 56 which extends between the chassis plates 28 and 30. As will be evident rotation of the bell crank 54 changes the angled relation between the first and second portions of 51 and 54a of arm F1, and thus the effective length of F1. An increase in the effective length of arm F1 displaces further the wheel 12 from the frame as defined by motor 10 and raises the motorcycle correspondingly further above the ground.

Rear displacement arm R1 includes as one portion, the rear shock absorber 48 centered generally on the rear swing arm 48, extending generally upwardly therefrom and having a spring 52a and a damper 52b. The lower end of the shock absorber 52 is pivotally connected to a pivot pin 58 which extends across the rear swing arm 48. The upper end of the shock absorber 52 is connected to arm 54b of the bell crank 54, the arm 54b defining the second portion of rear displacement arm R1, which functions as described for arm F1, but as to the rear wheel.

In operation, the position of the bell crank 54 is selected and fixed, such that the bell crank 54 functions as a rigid, fixed point of attachment for one end of each of the shock absorbers 51 and 52. Upward swinging motion of the front swing arm 32, for example as a result of a road shock, results in compression of the front shock absorber 51. In this regard, the front swing arm 32 and its integral cross member 32a function as a rotatable bell crank to translate swinging motion of the front swing arm 32 into compression or extension of the shock absorber 51.

Likewise, swinging motion of the rear swing arm 48 is translated into compression or extension of the rear shock absorber 52. It will be recognized that a weight load or road shock applied to the wheels of the motorcycle acts on the shock absorbers 51 and 52 in essentially identical manners, with the springs of the shock absorbers acting to resist compression and also return the swing arms to their normal positions, and with the dampers of the shock absorbers acting to damp swinging oscillations of the swing arms.

As noted, the angular position of the ball crank 54 is adjustable. This adjustment may be accomplished manually or automatically. The bell crank 54 may be rotated through an angular range of approximately 45 degrees and may be set at any selected angle within that range to thereby adjust the effective length of arms F1 and R1 and thereby select the resting compression of the shock absorbers 51 and 52, and thus also the ride height of the motorcycle. Two exemplary positions are illustrated in FIGS. 3 and 4. The position of the bell crank 54 is selected to accommodate varying road conditions and varying riding conditions.

It will be noted that in the embodiment shown in FIGS. 1-4 a single adjustment of the position of the bell crank 54 results in simultaneous adjustment of the resting compressions of both shock absorbers 51 and 52, and thus also the overall ride height of the motorcycle as determined by such resting compressions. This enables quick and efficient frame height adjustment to be made by variety of simple mechanisms.

FIGS. 5 and 6 illustrate alternative embodiments of the present invention. FIG. 5 illustrates an embodiment that is similar to the embodiment described above, except a rotor 541 is used in place of the bell crank 54 and the suspension is adapted to a motorcycle engine which is sized and shaped so as to not require the cross member 32a described above. Elements of the alternative embodiment of FIG. 5 which are the same as the elements of the described above and illustrated in FIGS. 1 through 4 are like-numbered. In the embodiment of FIG. 5 the front shock absorber 51 is connected directly to the front swing arm 32. It will be recognized that the embodiment of FIGS. 1 through 4, described above, is primarily intended to allow the front swing arm 32 to be pivotally attached to opposite sides of the engine, as close as possible to the center of gravity of the motorcycle.

The eccentric mounting points for the shock absorber 51, 52 ends on the rotor 541 exert the same affect as the bell crank 54 configuration, the arm portions 541a, 541b define with shock absorbers 51, 52, the displacement arms F2, R2.

In circumstances where it is not considered critically important to locate the points of attachment of the front suspension as close as possible to the center of gravity of the motorcycle, or where the engine configuration otherwise permits the front swing arm to be connected to the motorcycle frame at a point which does not require the integral cross member 32a crossing over the top of the engine, as described above with reference to FIGS. 1 through 4, it may be desirable to use the configuration shown in FIG. 5, as it offers the advantage of a shorter and more direct mechanical link between the front swing arm 32 and the front shock absorber 51, as shown.

FIG. 6 illustrates another alternative embodiment. A front swing arm 60 is connectible to the motorcycle frame by means of a pivot pin 62, and a rear swing arm 64 is connectible to the motorcycle frame by means of pivot pin 66. A shock absorber 68 is connected to front swing arm 60, at a point beneath pivot pin 62, by means of pivot pin 72, and the rear swing arm 64 is connected to a shock absorber 70 at a point beneath pivot pin 66 by means of pivot pin 74. The shock absorbers 68 and 70 are connected to opposite arms 76a, 76b of a rotatable crank 76 and together define displacement arms F3, R3. The crank 76 rotates about a center shaft 78 which is journalled to the frame of the motorcycle, and is selectively adjustable in its angular position so as to adjust the effective length resting compression of the shock absorbers 68 and 70, and thus adjust the ride height of the motorcycle. It will be appreciated that the advantage of the embodiment shown in FIG. 6 is that the shock absorbers 68 and 70 may be located beneath the engine of the motorcycle, thus enabling, for example, other components of the motorcycle, such as the seat, fuel tank, etc., to be also situated generally lower on the motorcycle.

FIG. 7 depicts a bell crank adjustment mechanism of the type used in the embodiment shown in FIGS. 1 through 4. In this embodiment the chassis plates 28 and 30 converge toward the bell crank 54, which is rotatably journalled in an appropriate bearing housing 80. Roller pin bearings 82 support the shaft 55 of the bell crank 54 on either side of the bell crank arms 54a and 54b (see FIG. 2). Shock absorber 51 is connected to bell crank arm 54a by means of a threaded lug 84. The bell crank shaft 55 includes splines 56 at one end, by means of which the bell crank 54 is rotated to effect adjustment of the motorcycle ride height.

FIG. 8 illustrates a worm gear adjustment mechanism for adjusting and setting the angular position of the bell crank 54 of FIG. 1-4 and 7. An internally and externally splined gear 86 is affixed to the complementary splined end of the bell crank shaft 55. A worm gear 88 is engaged with the gear 86, and is provided with a hand crank 90 at one end. To adjust the ride height, the crank 90 is turned, rotating worm 88, gear 86, shaft 55, and bell crank 54. This shifts arms 54a and 54b, lengthening or shortening the effective length of displacement arms F1 and R1, and effecting a corresponding adjustment of the wheel-frame distance and the motorcycle ride height. This height adjustment is made while the rider is riding, if desired.

Figure 9:
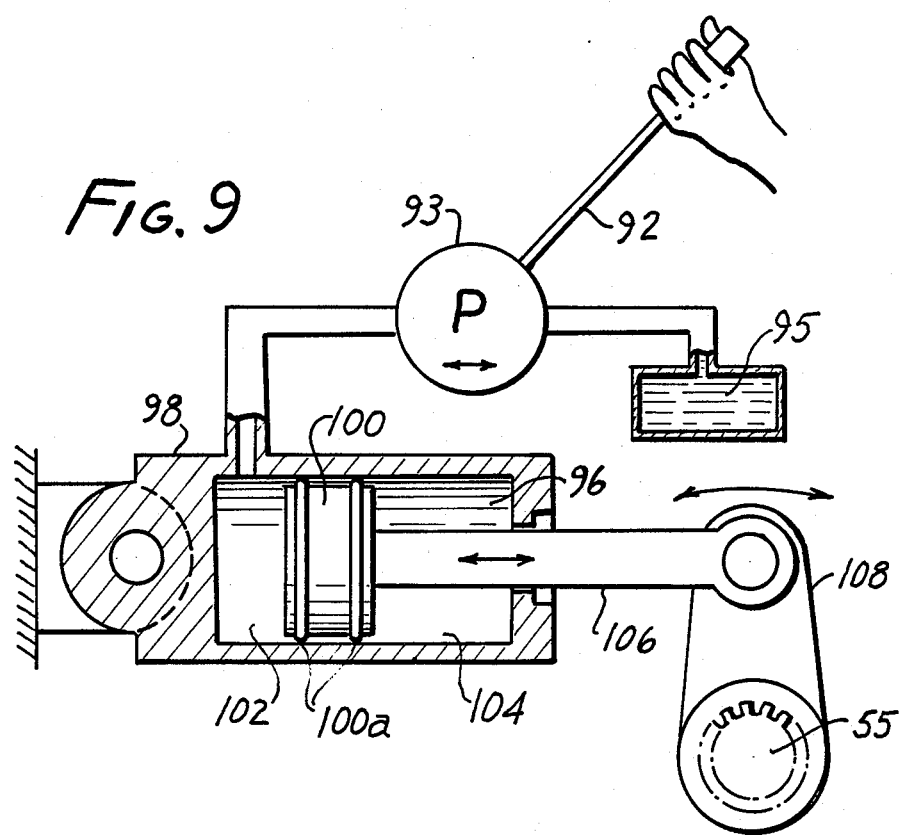
FIG. 9 is a schematic view of an hydraulically assisted adjustment mechanism.

In FIG. 9 an hydraulically assisted crank embodiment is shown. Handle 92 operates a reversible displacement pump 93 having an internal hydraulic fluid supply 95 with a sealed piston chamber 96 defined by cylinder 98. Piston 100 with sealing rings 100a operates in the chamber 96 responsive to the relative fluid pressure at 102, 104. Piston 100 drives a rod 106 which is journalled at its end opposite the piston to lever arm 108 which in turn is splined to bell crank shaft 55. As will be evident, increasing or decreasing fluid pressure at 102 by movement of pump handle 92 shifts the piston 100 and its rod 106, displacing the lever arm 108 angularly and rotating the shaft 55 splined thereto to correspondingly shift the shaft connected bell crank 54 arm portions 54a, 54b (shown in FIGS. 1-4). The upper ends of the shock absorbers 51, 52 (FIGS. 3, 4) connected to the arm portions 54a, 54b are thus displaced, changing the effective length of the displacement arms F1, R1, and changing the ride height of the motorcycle accordingly.

With reference now to FIGS. 10 and 11, a typical hydraulic circuit is shown for automatically controlling the operation of the rotating element such as bell crank 54. The following hydraulic arrangement is adaptable to the mechanism shown in FIG. 9, in lieu of the hand pump shown there. In the automatically controlled embodiment, introduction of the fluid for rotating element displacement is responsive to a sensed lean condition and does not require hand operation. Upon the absence of lean, the system restores the original angular disposition of the rotating element and thus the original, at rest, height of the motorcycle giving a lower profile for straightaways and lower center of gravity. When a lean is encountered as in banking the motorcycle, the automatic system uses the hydraulic fluid to lift the motorcycle by rotating the rotating element supporting the shock absorbers on the frame, changing the angular relation of the arm portions defining the displacement arm in a manner to effectively lengthen them and thus to raise up the motorcycle to permit banking without hitting the ground.

In the automated embodiment, a bank sensor 200, such as the aircraft turn coordinator sold by Electric Gyro Corporation Model 1394 T100 is used to sense the relative vertical attitude of the motorcycle. A pair of microswitches (Burgess Ultra Minature Model F5T8Y1) 202, 204 are positioned so as to be activated by the turn indicator needle 200a upon the commencement or termination of a predetermined lean of the motorcycle. Closing of the switch 202 (or 204), see FIG. 11, closes the circuit including battery 206, starter solenoid 208 which is connected to pump motor 210 (Delta Power Hydraulic Co. Model HP-100), relays 212 operating opposed check valves, relays 213 operating flow control solenoid valves 214, 215 and roller type cylinder movement limit switch 216. Closing of the circuit activates the pump motor and pumps hydraulic fluid from a supply S through a valve (not shown) controlled by solenoids 214, 215 into a hydraulic cylinder, e.g. like cylinder 98 above, and preferably a Hydro-Line Mfg. Co. N5 Series 1.5 inch bore, 1.33 inch stroke pump. The pressurized hydraulic fluid operates the piston 100 to extend the cylinder length when lean commences to deflect the lever arm 108 and rotate the shaft 55 and its bell crank 54, raising the motorcycle. Upon the end of the lean increase, and the commencement of a decrease in angle of lean, the solenoids 214, 215 operate to reverse the direction of travel of the piston 100, retracting the length of the cylinder, and lowering the height of the motorcycle, again until the cylinder movement switch 216 is activated shutting down the pump.

The foregoing objectives are thus met by the just described apparatus in that there is provided a suspension mechanism whereby the weight and shock loads on both wheels are borne by the motorcycle frame at a point close to its center of gravity, an adjustment mechanism by which both front and rear swing arms can be separately or simultaneously pre-loaded with a desired level of displacement through a variable effective length arm, so as to adjust the ride height and shock-bearing characteristics of one or both wheels of the motorcycle at once, the suspension is adjustable by the rider or automatically during the ride, and continuously responsive to ride conditions so as to have at all times during the ride the optimum height for the conditions being encountered, and a basic design conflict in motorcycle design has been overcome by obviating the heretofore necessary tradeoff between ground clearance through a turn and a lowered center of gravity and minimum profile needed on straightaways, by having the best characteristics available as needed, on demand.

We claim:

1. A motorcycle having a frame, front and rear wheels carried on the frame by respective front and rear wheel wing arms, and means for adjusting the frame position relative to said wheels to correspondingly vary the motorcycle ride height, said means comprising an articulated displacement arm having a first portion defined by a rotor mounted to said frame and a second portion interconnected with said first portion, said arm portions being coupled between said front wheel swing arm and said frame for relatively different angular disposition to lengthen or shorten the effective length of said arm portions combined, whereby the frame position relative to said front wheel is adjusted and the motorcycle ride height correspondingly raised or lowered.

2. The motorcycle according to claim 1, including also a rear wheel coupled, second articulated displacement arm having a first portion defined by a rotating element and a second arm portion, said second arm first and second arm portions being coupled between said rear wheel swing arm and said frame for relatively different angular disposition to lengthen or shorten the effective length of said arm portions combined, whereby the frame position relative to said rear wheel is adjusted and the motorcycle ride height correspondingly raised or lowered.

3. A motorcycle having a frame, front and rear wheels carried on the frame by respective front and rear wheel swing arms, and means for adjusting the frame position relative to said wheels to correspondingly vary the motorcycle ride height, said means comprising a rotor defining a first displacement arm portion pivotally mounted to said frame, and a second diplacement arm portion pivotally secured to said first displacement arm portion at a point radially offset from said first displacement arm portion mounting to said frame for varying the effective length of said arm portions combined as a function of rotation of said rotor, whereby the frame position relative to said front wheel is adjusted and the motorcycle ride height correspondingly raised or lowered.

4. Motorcycle according to claim 2, in which each said front and rear wheel swing arm coupled first arm portion is pivotally mounted by said rotating element to said frame, and each said second arm portion is pivotally secured to its respective first arm portion at a point radially offset from said respective first arm portion mounting to said frame for varying the effective length of said arm portions combined as a function of rotation of said rotating element.

5. Motorcycle according to claim 1, in which said second displacement arm portion defines a spring-shock absorber unit.

6. Motorcycle according to claim 2, in which said second displacement arm portion defines a spring-shock absorber unit.

7. Motorcycle according to claim 1, in which said rotor defines a radially disposed extent forming said first displacement arm portion.

8. Motorcycle according to claim 2, in which said rotating element defines a radially disposed extent forming said first displacement arm portion.

9. Motorcycle according to claim 8, in which said rotating element has angularly related first and second radially disposed extents, said extents defining said first displacement arm portions for said front and rear wheel swing arm adjustment respectively.

10. Motorcycle according to claim 9, in which said rotating element is a unitary body whereby rotation of said element simultaneously varies the effective length of said rear wheel and said front wheel displacement arm first and second portions combined.

11. Motorcycle having a frame, front and rear wheels carried on the frame by respective front and rear wheel swing arms, and means for adjusting the frame position relative to said wheels to correspondingly vary the motorcycle ride height, said means comprising an articulated displacement arm having a first portion defined by a rotor and a second portion interconnected with said first portion, said arm portions being coupled between said front wheel swing arm and said frame for relatively different angular disposition to lengthen or shorten the effective length of said arm portions combined, a crank for bodily shifting said first displacement arm portion relative to said frame with said second displacement arm portion coupled thereto and to said swing arm to thereby vary the angular disposition of said first and second displacement arm portions, whereby the frame position relative to said front wheel is adjusted and the motorcycle ride height correspondingly raised or lowered.

12. Motorcycle according to claim 11, in which said frame position adjusting means further includes a rotating element, said rotating element having a radially disposed extent defining said first displacement arm portion and driver means cooperating with said crank for rotation of said rotating means.

13. Motorcycle according to claim 12, in which said rotating element driver means and said crank define cooperating gear means for crank rotation of said rotating element.

14. Motorcycle according to claim 13, in which said crank comprises a rotating gear and means to rotate said gear, said rotating element defining a toothed surface engageable with said crank rotating gear.

15. Motorcycle according to claim 13, in which said crank rotating means comprises a manually operable handle which is shiftable by the rider during riding to vary the motorcycle ride height through rotation of said rotating element and displacement of said swing arm by said displacement arm portions whose relative angularity and effective combined length is varied by the element rotation.

16. Motorcycle according to claim 13, in which said crank rotating means comprises a lever fulcrumed on said crank, and an hydraulically shiftable piston having a rod coupled to lever in crank rotating relation.

17. Motorcycle according to claim 16, including also means to admit hydraulic fluid under pressure to said piston, for shifting said piston in crank rotating relation.

18. Motorcycle according to claim 17, including also sensing means sensing the angle of said motorcycle to the ground, and means responsive to an increase or decrease in that angle to admit or withdraw hydraulic fluid to or from said piston to rotate said rotating element and correspondingly raise or lower said frame relative to said wheels to accommodate angled cornering or upright travel of said motorcycle.

19. Motorcycle according to claim 17, in which said sensing means is a switch adapted to move with the motorcycle into a leaning condition, and including also a pivotally mounted needle adapted to remain immobile relative to said switch during leaning of said motorcycle, said needle and switch being juxtaposed to contact upon a predetermined condition of lean being achieved, and not to contact in the absence of such a lean condition.

20. In a motorcycle having a frame, a front wheel and a rear wheel, and a front swing arm and a rear swing arm each pivotally connected to said frame, the improvement comprising a single point adjustable suspension system, including a front shock absorber having first and second ends, said first end of said first shock absorber being pivotally connected to said front swing arm and said second end of said front shock absorber being pivotally connected to a first arm of a bell crank rotatably journalled to said frame of said motorcycle, said first end of said rear shock absorber being pivotally connected to said rear swing arm and said second end of said rear shock absorber being pivotally connected to a second arm of said bell crank, and said bell crank including means for selectively adjusting and setting the angular position of said bell crank so as to thereby adjust the ride height of the motorcycle.

* * * * *